(No Model.)

C. M. BURGESS.
LATCH CASE.

No. 404,892. Patented June 11, 1889.

Witnesses.
John Edwards Jr.
J. O. Deming

Inventor.
Charles M. Burgess,
By James Shepard
Atty.

UNITED STATES PATENT OFFICE.

CHARLES M. BURGESS, OF NEW BRITAIN, CONNECTICUT, ASSIGNOR TO THE RUSSELL & ERWIN MANUFACTURING COMPANY, OF SAME PLACE.

LATCH-CASE.

SPECIFICATION forming part of Letters Patent No. 404,892, dated June 11, 1889.

Application filed March 26, 1889. Serial No. 304,814. (No model.)

*To all whom it may concern:*

Be it known that I, CHARLES M. BURGESS, a citizen of the United States, residing at New Britain, in the county of Hartford and State of Connecticut, have invented certain new and useful Improvements in Latch-Cases, of which the following is a specification.

My invention relates to improvements in sheet-metal latch-cases; and the objects of my improvement are economy in construction and increased efficiency of the article.

Figure 1:
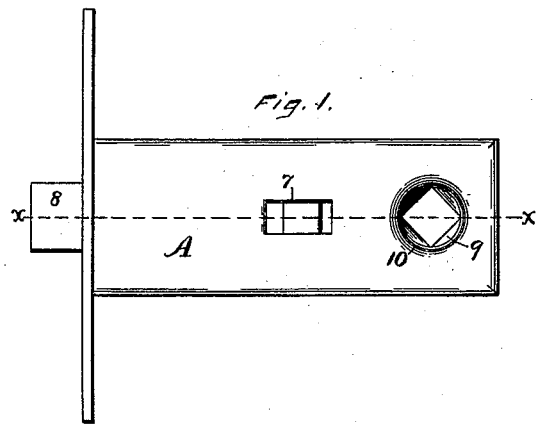
Figure 2:
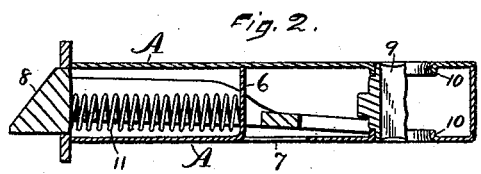
Figure 3:
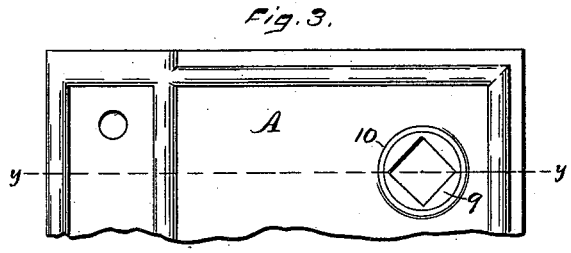
Figure 4:
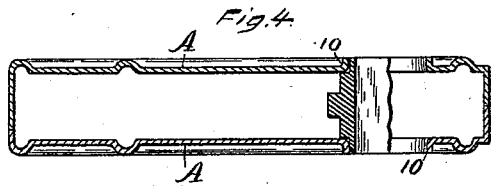
Figure 5:
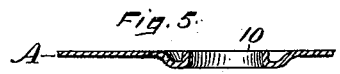

In the accompanying drawings, Figure 1 is a side elevation of a latch and case which embodies my improvement. Fig. 2 is a sectional view of the same on the line $x$ $x$ of Fig. 1. Fig. 3 is a side view of a portion of a case for a rim-lock which embodies one feature of my improvement. Fig. 4 is a section of the same on line $y$ $y$ of Fig. 3, and Fig. 5 is a section of a portion of my latch-plate.

In Figs. 2 and 4 the latch-hub is represented as broken away upon one side in order to better show its bearings in the latch-case.

The general form of the latch-case may be of any ordinary construction. An example of a sheet-metal latch-case to which my present invention is applicable is shown in my patents, Nos. 396,915 and 396,916, dated January 29, 1889. Instead of inserting a separately-formed base or support for the spring 11, Fig. 2, I form said base 6 as an integral part of one of the latch-plates A A by cutting the plate upon three sides of the body of said base and then bending it at the uncut portion into the position shown in Fig. 2, leaving the opening 7 in the plate A, as shown. This base 6, I form of a length equal to the thickness of the latch-case, whereby it serves not only as a base for the spring, but as a rest or support for the companion latch-plate A. The spring 11, latch-bolt 8, and the hub 9 are of ordinary construction.

The second part of my improvement relates to the bearing for the hub 9. Instead of a simple hole in the plates A A of a right size to receive the trunnions of the hub, I first make the hole smaller than the diameter of the trunnions and then turn a flange or rim 10 at right angles to the latch-plates, whereby I obtain an increase in the length of the bearings, and at the same time am enabled to construct said bearings of a sheet metal which is much thinner than the length of these bearings, measured in an axial direction of the hub. This flange or rim for the bearings may be turned inwardly, as shown in Figs. 1 and 2, or outwardly, as shown in Figs. 3 and 4. If desired, a bead or groove may be swaged in the plate immediately surrounding the rim 10, as shown in Fig. 5. The plate shown in this figure may be used either side out, as occasion requires.

I claim as my invention—

1. The sheet-metal latch-case having the base 6 for the spring 11 formed integral with one of the latch-plates A, cut and bent from the body thereof, substantially as described, and for the purpose specified.

2. The herein-described sheet-metal latch-case having the rim or flange 10 swaged up from the plates A A and forming bearings for the latch-hub, substantially as described, and for the purpose specified.

CHAS. M. BURGESS.

Witnesses:
 THOS. S. BISHOP,
 M. S. WIARD.